(12) United States Patent
Kim et al.

(10) Patent No.: US 11,249,578 B2
(45) Date of Patent: Feb. 15, 2022

(54) ELECTRONIC DEVICE AND METHOD FOR CHANGING CONDITION FOR DETERMINING TOUCH INPUT TO BE PRESSURE INPUT

(71) Applicant: Samsung Electronics Co., Ltd., Gyeonggi-do (KR)

(72) Inventors: Mansung Kim, Gyeonggi-do (KR); Aram Song, Gyeonggi-do (KR); Changjin Kim, Gyeonggi-do (KR); Minuk Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/981,433

(22) PCT Filed: Mar. 22, 2019

(86) PCT No.: PCT/KR2019/003389
§ 371 (c)(1),
(2) Date: Sep. 16, 2020

(87) PCT Pub. No.: WO2019/182414
PCT Pub. Date: Sep. 26, 2019

(65) Prior Publication Data
US 2021/0064207 A1 Mar. 4, 2021

(30) Foreign Application Priority Data
Mar. 23, 2018 (KR) .................. 10-2018-0034000

(51) Int. Cl.
*G06F 3/041* (2006.01)
*G06F 3/0488* (2013.01)

(52) U.S. Cl.
CPC ........ *G06F 3/04146* (2019.05); *G06F 3/0412* (2013.01); *G06F 3/0488* (2013.01); *G06F 2203/04105* (2013.01)

(58) Field of Classification Search
CPC .. G06F 3/04146; G06F 3/0412; G06F 3/0488; G06F 2203/04105; G06F 3/04883; G06F 3/04847; G06F 3/041
See application file for complete search history.

(56) References Cited

U.S. PATENT DOCUMENTS

2009/0027353 A1 1/2009 Im et al.
2015/0317021 A1* 11/2015 Park ................ G06F 3/04162
345/173

(Continued)

FOREIGN PATENT DOCUMENTS

KR 10-2009-0011686 A 2/2009
KR 10-2016-0132671 A 11/2016
(Continued)

*Primary Examiner* — Sahlu Okebato
(74) *Attorney, Agent, or Firm* — Cha & Reiter, LLC

(57) ABSTRACT

According to various embodiments of the present invention, an electronic device and a method for changing a condition for determining a touch input to be a pressure input store, in a memory, at least one piece of information relating to a sensed touch input that satisfies a designated condition in a designated time, when the touch input sensed by a sensor module satisfies a pressure input condition, and change the pressure input condition at least on the basis of the stored information, wherein the at least one piece of information can comprise information regarding at least one of speed, strength, or location of the input, and additional various embodiments are possible.

15 Claims, 10 Drawing Sheets

(56) References Cited

U.S. PATENT DOCUMENTS

| | | | |
|---|---|---|---|
| 2016/0170624 A1* | 6/2016 | Zambetti | G06F 1/163 |
| | | | 715/771 |
| 2016/0334914 A1 | 11/2016 | Kim et al. | |
| 2017/0052630 A1 | 2/2017 | Kim et al. | |
| 2017/0249048 A1 | 8/2017 | Hill et al. | |
| 2019/0294287 A1 | 9/2019 | Kim et al. | |
| 2019/0370584 A1* | 12/2019 | Wang | G06F 1/1684 |

FOREIGN PATENT DOCUMENTS

| KR | 10-2017-0022192 A | 3/2017 |
|---|---|---|
| KR | 10-1719577 B1 | 4/2017 |
| KR | 10-2018-0009147 A | 1/2018 |
| KR | 10-2018-0014575 A | 2/2018 |

* cited by examiner

ELECTRONIC DEVICE AND METHOD FOR CHANGING CONDITION FOR DETERMINING TOUCH INPUT TO BE PRESSURE INPUT

CROSS-REFERENCE TO RELATED APPLICATION(S)

This application is a National Phase Entry of PCT International Application No. PCT/KR2019/003389, which was filed on Mar. 22, 2019, and claims priority to Korean Patent Application No. 10-2018-0034000, which was filed on Mar. 23, 2018, the contents of which are incorporated herein by reference.

BACKGROUND

1. Field

Various embodiments of the disclosure relate to an electronic device and a method for changing a condition to determine a touch input as a part of a pressure input.

2. Description of the Related Art

Various recently-used electronic devices have been developed to include a sensor module for sensing a touch (for example, pressure) input. For example, the sensor module may be configured not only to sense a received touch input, but also to determine various pieces of information regarding the touch input.

In addition, various applications (also referred to as "apps", for example) may be installed and executed in electronic devices. In order to execute and control the applications by electronic devices, measurement values sensed through various input means (for example, touch-screen, button, mouse, keyboard, sensor, and the like) may be used.

SUMMARY

An electronic device may determine various pieces of information related to a sensed touch input and may determine, according to whether or not the determined information satisfies a predesignated condition, the touch input as at least a part of a pressure input.

An electronic device and a method for changing a condition to determine a touch input as at least a part of a pressure input in connection with an electronic device, according to various embodiments of the disclosure, may store various pieces of information regarding a sensed touch input and may change a condition to determine whether or not the touch input is a pressure input, based on the stored information.

An electronic device according to various embodiments of the disclosure may include: a sensor module; a processor operatively connected to the sensor module; and a memory operatively connected to the processor. The memory may store instructions that, when executed, cause the processor to: determine, if a touch input sensed by the sensor module satisfies an input condition of a pressure input, at least one piece of information related to the sensed touch input satisfying a designated condition within a designated time; and change the input condition of the pressure input, at least based on the determined information. The at least one piece of information may include at least one of velocity, intensity, or position of the sensed touch input.

An electronic device according to various embodiments of the disclosure may include: a sensor module; a processor operatively connected to the sensor module; and a memory operatively connected to the processor. The memory may store instructions that, when executed, cause the processor to: sense a touch input satisfying a pressure input condition through the sensor module; determine the velocity of the sensed touch input satisfying a designated condition within a designated time; and change the input condition of the pressure input, at least based on the velocity of the touch input.

A method for changing a condition to determine a touch input as a pressure input by an electronic device according to various embodiments of the disclosure may include the operations of: sensing a touch input satisfying a pressure input condition through the sensor module; determining at least one piece of information related to the sensed touch input satisfying a designated condition within a designated time; and changing the pressure input condition, at least based on the determined information. The at least one piece of information may include at least one of velocity, intensity, or position of the input.

According to various embodiments of the disclosure, a storage medium may have commands stored therein. The commands may be configured to cause, when executed by at least one processor, the at least one processor to perform at least one operation. The at least one operation may include the operations of: sensing a touch input satisfying a pressure input condition through the sensor module; determining at least one piece of information related to the sensed touch input satisfying a designated condition within a designated time; and changing the pressure input condition, at least based on the determined information.

According to various embodiments of the disclosure, an electronic device and a method for changing a condition to determine a touch input as a pressure input by the electronic device may store various pieces of information regarding a sensed touch input, and may configure various pressure input conditions according to the user's input pattern, in response to changing a pressure input condition by using the stored information.

DETAILED DESCRIPTION

Figure 1:
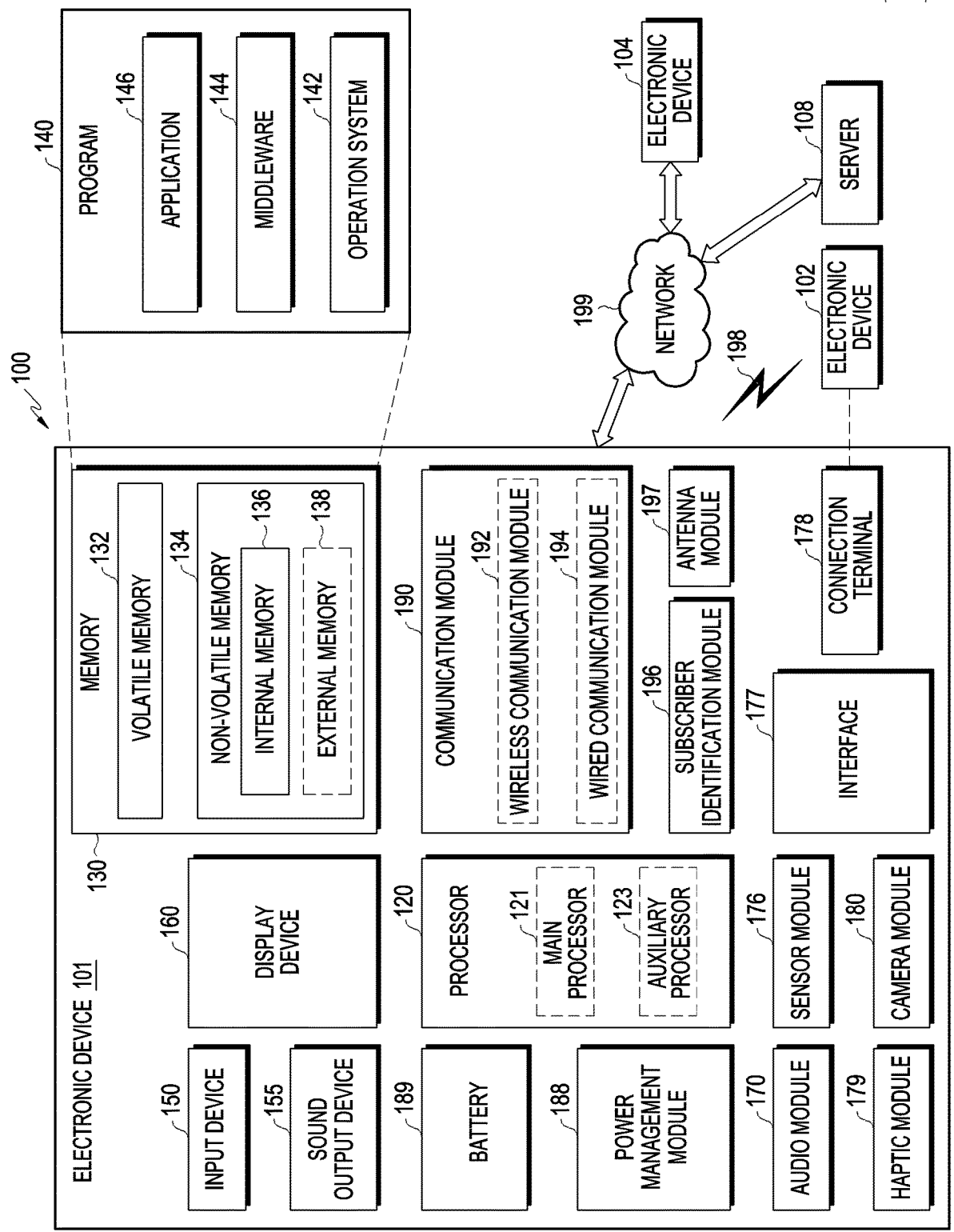
FIG. 1 is a block diagram of an electronic device inside a network environment according to various embodiments of the disclosure.

Hereinafter, various embodiments of this document will be described with reference to the accompanying drawings. It should be appreciated that embodiments and terms used therein are not intended to limit the technological features set forth herein to particular embodiments and include various changes, equivalents, or replacements of corresponding embodiments. With regard to the description of the drawings, similar reference numerals may be used to refer to similar elements. A singular form of a noun may include a plural form thereof, unless the relevant context clearly indicates otherwise. As used herein, a phrase such as "A or B" or "at least one of A or B" may include all possible combinations of the items enumerated together. As used herein, such terms as "$1^{st}$", "$2^{nd}$", "first", and "second" may modify corresponding elements regardless of the order or importance thereof, and are simply used to distinguish an element from another, and do not limit the corresponding elements. If an element (for example, first element) is described as "(functionally or communicatively) connected" or "coupled" to another element (for example, second element), the element may be directly connected to the other element or connected via another element (for example, third element).

As used herein, an element "configured to . . . " may be used interchangeably with, for example, a hardware or software element "adapted to . . . ", "having an ability to . . . ", "modified to . . . ", "made to . . . ", "capable of . . . ", or "designed to . . . ". In some situations, the expression "a device configured to . . . " may mean that the device is "capable of . . . " together with other devices or components. For example, the description "a processor configured to perform A, B, and C" may refer to a dedicated processor (for example, embedded processor) for performing the corresponding operations, or a universal processor (for example, CPU or application processor) capable of performing the corresponding operations by executing one or more software programs stored in a memory device.

An electronic device according to various embodiments of this document may include, for example, at least one of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, or a wearable device. The wearable device may include at least one of an accessory-type device (for example, watch, bracelet, ankle bracelet, necklace, glasses, contact lenses, or head-mounted device (HMD)), a fabric or garment-integrated device (for example, electronic garment), a body-attached device (for example, skin pad or tattoo), or a bio-implantable circuit. In some embodiments, the electronic device may include, for example, at least one of a television set, a digital video disk (DVD) player, an audio system, a refrigerator, an air conditioner, a cleaner, an oven, a microwave oven, a washing machine, an air purifier, a set-top box, a home automation control panel, a security control panel, a media box (for example, Samsung HomeSync™, Apple TV™, or Google TV™), a game console (for example, Xbox™, Playstation™), an electronic dictionary, an electronic key, a camcorder, or a digital picture frame.

In another embodiment, the electronic device may include at least one of various kinds of medical devices (for example, various kinds of portable electronic measurement devices (blood glucose meter, heartbeat meter, blood pressure meter, body temperature meter, or the like), magnetic resonance angiography (MRA), magnetic resonance imaging (MRI), computed tomography (CT), imaging device, ultrasonic device, or the like), a navigation device, a global navigation satellite system (GNSS), an event data recorder (EDR), a flight data recorder (FDR), a car infotainment device, ship electronic equipment (for example, ship navigation device, gyro compass, or the like), an avionics, a security device, a vehicle head unit, an industrial or domestic robot, a drone, a financial institute ATM, a store point-of-sales (POS), or an Internet-of-Things device (for example, lightbulb, various kinds of sensors, sprinkler device, fire alarm, temperature adjuster, streetlight, toaster, workout device, warm-water tank, heater, boiler, or the like). According to some embodiments, the electronic device may include at least one of furniture, a part of a building/structure or a car, an electronic board, an electronic signature receiving device, a projector, or various kinds of measurement devices (for example, water meter, electricity meter, gas meter, radio wave measuring device, or the like). In various embodiments, the electronic device may be flexible, or may be a combination of at least two of the above-mentioned various devices. The electronic device according to an embodiment of this document is not limited to the above-mentioned devices. As used herein, the term "user" may refer to a person using an electronic device or a device (for example, artificial intelligence electronic device) using an electronic device.

Hereinafter, an electronic device and a method for changing a condition to determine a touch input as a pressure input, according to various embodiments of the disclosure, will be described with reference to the accompanying drawings. As used herein, the term "user" may refer to a person using an electronic device or a device (for example, artificial intelligence electronic device) using an electronic device.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
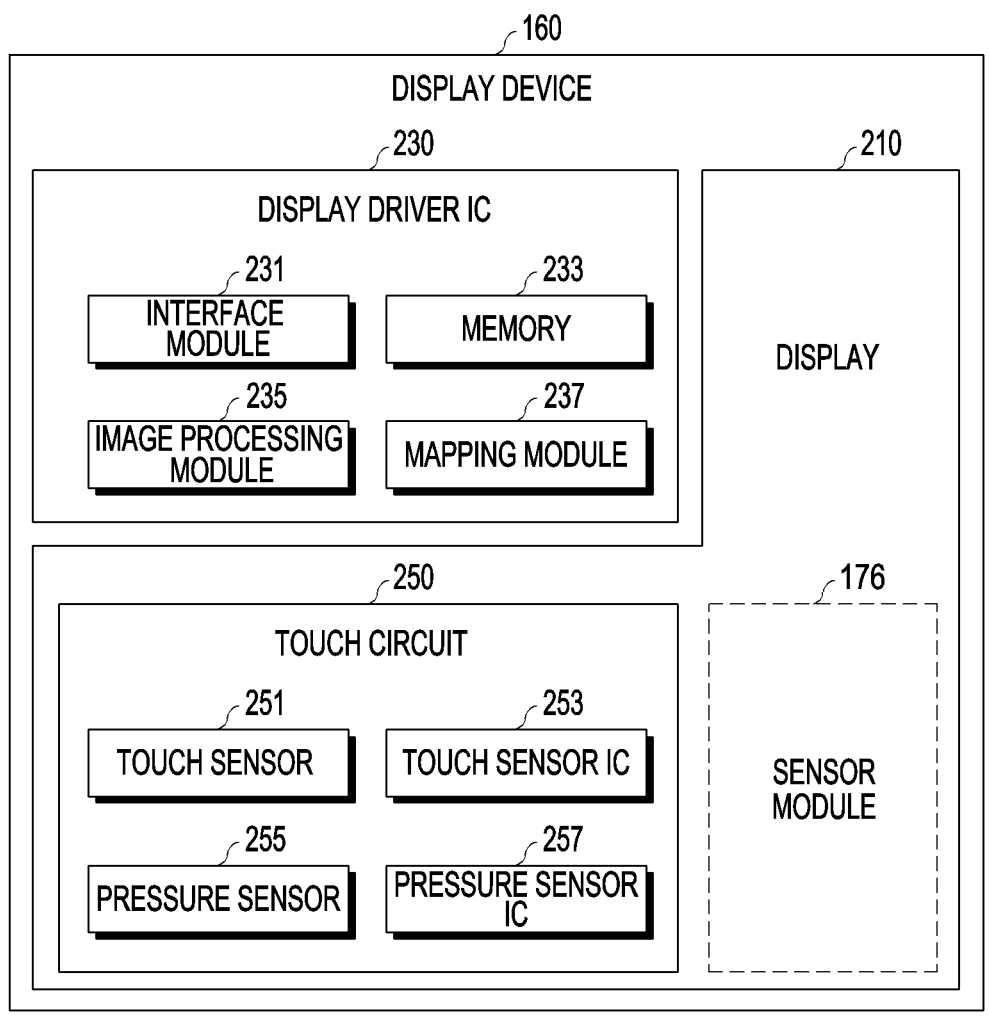
FIG. 2 is a block diagram illustrating an example of the configuration of a display device according to various embodiments of the disclosure.

FIG. 2 is a block diagram illustrating an example of the configuration of a display device according to various embodiments of the disclosure.

Referring to FIG. 2, the display device 160 may include a display 210 and a display driver integrated circuit (DDI) 230 for controlling the same. The DDI 230 may include an interface module 231, a memory 233 (for example, buffer memory), an image processing module 235, or a mapping module 237. The DDI 230 may receive image data or image information including an image control signal corresponding to a command for controlling the image data from a processor 120 (for example, a main processor 121 (for example, application processor) or an auxiliary processor 123 operating independently of the function of the main processor 121) through the interface module 231, for example. The DDI 230 may communicate with a touch circuit 250, a sensor module 176, or the like via the interface module 231. In addition, the DDI 230 may store at least a part of the received image information in the memory 233 frame by frame, for example. The image processing module 235 may preprocess or postprocess (for example, adjust the resolution, brightness, or size of) at least a part of the image data, for example, at least based on the characteristics of the image data or characteristics of the display 210. The mapping module 237 may, at least partially based on the attribute of pixels of the display 210 (for example, pixel arrangement (RGB stripe or PenTile) or size of each subpixel), convert the image data preprocessed or postprocessed by the image processing module 235 into a voltage value or a current value, by which the pixels can be driven. At least some of the pixels of the display 210 may be driven based on the voltage value or current value, for example, such that the display 210 displays visual information (for example, text, image, or icon) corresponding to the image data.

According to an embodiment, the display device 160 may further include a touch circuit 250. The touch circuit 250 may include a touch sensor 251, a touch sensor IC 253 for controlling the same, a pressure sensor 255, and a pressure sensor IC 257 for controlling the same. The touch sensor IC 253 may control the touch sensor 251 so as to measure a change in a signal (for example, voltage, amount of light, resistance, or amount of charge) regarding a specific position of the display 210, for example, thereby sensing a touch input or a hovering input regarding the specific position, and providing the processor 120 with information (for example, position, area, pressure, or time) regarding the sensed touch input or hovering input. According to an embodiment, at least a part (for example, touch sensor IC 253) of the touch circuit 250 may be included as a part of the display driver IC 230 or the display 210, or as a part of another component (for example, auxiliary processor 123) disposed on the outside of the display 160.

The pressure sensor 255 according to various embodiments of the disclosure may sense a pressure input by using a capacitive scheme, an inductive scheme, a strain gauge scheme, or a piezo scheme.

The capacitive-type pressure sensor according to various embodiments of the disclosure may sense a pressure, based on a change in a capacitance formed between two electrodes according to the user's pressure. For example, the capacitance may increase as the distance between the two electrodes is reduced by the user's pressure.

The inductive-type pressure sensor according to various embodiments of the disclosure may sense a pressure, based on a change in a current induced in an inductor (for example, coil) according to the user's pressure. For example, the current may increase as an inductor (for example, coil) disposed inside a housing approaches a conductor (for example, metal housing, user's finger, or the like) by means of the user's pressure.

The strain gauge-type pressure sensor according to various embodiments of the disclosure may sense a pressure, based on a change in the resistance of a conductor according to the user's pressure. For example, the resistance may increase as the sectional area of the conductor is reduced by an increase in the length of the conductor resulting from the user's pressure. The wire of the resistance in the strain gauge type may be configured in a Wheatstone bridge type.

The piezo-type pressure sensor according to various embodiments of the disclosure may sense a pressure, based on a difference in the current or voltage resulting from a piezoelectric material according to the user's pressure. For example, the difference in current or voltage may increase in proportion to the amount of current converted by the piezoelectric material according to the user's pressure.

According to various embodiments of the disclosure, the touch sensor IC 253 may transmit or receive a signal (for example, transmission signal (TX), reception signal (RX), shield, or the like) to or from the pressure sensor 255. For example, the pressure sensor IC 257 may transmit the intensity (pressure) of a sensed touch input and/or the time of duration of the pressure to the processor 120. The processor 120 or the pressure sensor IC 257 may determine the intensity (pressure) of the user's touch input and/or the time of duration of the pressure, based on a signal received from the pressure sensor 255.

According to various embodiments of the disclosure, the display device 160 may further include a cover window. For example, the pressure sensor 255 may be disposed between the cover window and the display 210, or may be disposed at least partially inside the display 210. The pressure sensor 255 may be implemented in a self-capacitance type or in a mutual capacitance type.

According to various embodiments of the disclosure, a self-capacitance-type pressure sensor may include first electrodes having the shape of multiple repeated polygons (or circles), a single second electrode extending across the entire area corresponding to the multiple repeated polygons, and a dielectric layer disposed between the first electrodes and the second electrode. For example, the self-capacitance-type pressure sensor may sense a pressure, based on a change in the capacitance between the second electrode and respective partial electrodes among the first electrodes. The position or type of the first electrodes and the second electrode may be switched to each other.

According to various embodiments of the disclosure, a mutual capacitance-type pressure sensor may include a first electrode extending in a first direction, a second electrode extending in a second direction substantially perpendicular to the first direction, and a dielectric layer disposed between the first electrode and the second electrode. For example, the mutual capacitance-type pressure sensor may sense a pressure, based on a change in the capacitance between the first electrode and the second electrode at a point of intersection between the first electrode and the second electrode. The position or type of the first electrode and the second electrode may be switched to each other.

According to an embodiment, the display device 160 may further include at least one sensor (for example, fingerprint sensor, iris sensor, pressure sensor, or illuminance sensor) of a sensor module 176, or a control circuit related thereto. In this case, the at least one sensor or the control circuit related thereto may be implemented so as to be embedded in a part (for example, display 210 or DDI 230) of the display device 160, or in a part of the touch circuit 250. For example, when the sensor module 176 embedded in the display device 160 includes a biometric sensor (for example, fingerprint sensor), the biometric sensor may acquire biometric information (for example, fingerprint image) related to a touch input through a partial area of the display 210. As another example, when the sensor module 176 embedded in the display device 160 includes a pressure sensor, the pressure sensor may acquire pressure information regarding a touch input through a partial or entire area of the display 210. According to an embodiment, the touch sensor 251 or the sensor module 176 may be disposed between pixels of a pixel layer of the display 210, or above or below the pixel layer.

Figure 3A:
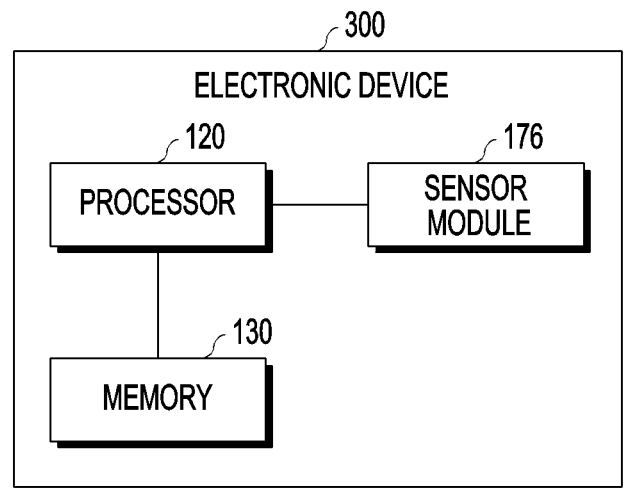
FIG. 3A and FIG. 3B are block diagrams illustrating various examples of the configuration of an electronic device according to various embodiments of the disclosure.
Figure 3B:
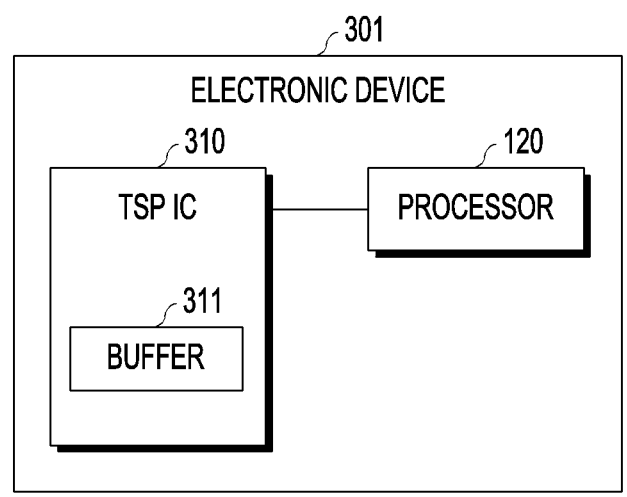

FIG. 3A and FIG. 3B are block diagrams illustrating various examples of the configuration of an electronic device according to various embodiments of the disclosure.

Referring to FIG. 3A, the electronic device 300 may include a processor 120, a memory 130, and a sensor module 176.

The processor 120 may identify a touch input sensed through the sensor module 176, and may determine the type of the touch input (for example, force touch), based on values measured with regard to the touch input. For example, the processor 120 may identify the value of at least one of the intensity, velocity, area, or input position of the touch input measured with regard to the touch input.

According to various embodiments, the sensor module 176 may identify a sensed touch input, and may determine the type of the touch input (for example, force touch), based on values measured with regard to the touch input. The result of the touch input determined by the sensor module 176 may be provided to the processor 120.

According to various embodiments of the disclosure, the electronic device 300 may determine, as the type of the touch input, whether the sensed input is a touch input intended to perform an operation according to whether or not the display is contacted (for example, non-force touch or normal touch), or is a force touch (or press) intended to perform a designated operation as a result of pressing the display 210 at a designated velocity or designated intensity or higher. According to various embodiments, the electronic device 300 may determine, according to whether or not the touch input satisfies a designated condition, whether the touch input is a tap which is an input made by slightly tapping the display by a finger for a short time, whether the touch input is flick which is an input made by releasing a finger from the display before stopping a finger movement in order to quickly scroll or rotate the display, whether the touch input is a drag which is an input for moving or scrolling a display element, whether the touch input is a drag & drop which is an input made by moving an object while touching it and then releasing the finger after stopping it, whether the touch input is a swipe which is an input made by touching the display from above by a finger and then moving the same horizontally or vertically while maintaining the touch, or whether the touch input is a touch & hold which is an input made by making a continuous finger touch until a display element appears.

The sensor module 176 may be disposed between, above, or below pixel layers of the display (for example, 210) of the electronic device 300, or may be configured below a button disposed on a part of the housing of the electronic device 300 separately from the display. For example, when the button is touched by the user's body (for example, finger), the sensor module 176 may receive a signal resulting from a change in the capacitance of the user's body, thereby identifying a sensed touch input.

The memory 130 may store various pieces of information related to a touch input. For example, the memory 130 may store at least one threshold value configured as a pressure input condition to determine whether or not the touch input is a pressure input, or condition information for changing the at least one threshold value. The at least one threshold value may include a threshold value of the input velocity or input intensity. The condition information for changing the threshold value may include various pieces of information related to a touch input, such as the quantity of information to be processed (for example, to be stored) in connection with a sensed touch input, the storage interval, or the position of the touch input (or the area of the touch input).

According to various embodiments of the disclosure, the memory 130 may filter the stored information related to a touch input such that data that causes an abrupt change in the pressure input condition is not considered. For example, the filtering may employ various filters such as an infinite impulse response (IIR) filter and a median filter, or may adopt a machine learning scheme by which the pattern of the user's failed touch inputs is analyzed.

An electronic device 300 according to various embodiments of the disclosure may include a sensor module, a processor 120 operatively connected to the sensor module, and a memory 130 operatively connected to the processor 120. The memory 130 may store instructions that, when executed, cause the processor 120 to: determine, when a touch input sensed by the sensor module satisfies a pressure input condition, at least one piece of information related to the sensed touch input satisfying a designated condition within a designated time; and change the pressure input condition, at least based on the determined information. The at least one piece of information may include at least one of velocity, intensity, or position of the sensed touch input.

According to various embodiments of the disclosure, a weight is assigned to designated information among the at least one piece of information. The instructions may be configured to cause the processor 120 to change a threshold value in view of the weight assigned to the pressure input condition, at least based on the determined values.

According to various embodiments of the disclosure, the instructions may be configured to cause the processor 120 to: configure, when the stored at least one piece of information exhibits a value lower than a first threshold value configured as the condition of the pressure input, the first threshold value to be lower than a designated size; and configure, when the stored at least one piece of information exhibits a value larger than the first threshold value, the first threshold value to be larger than the designated size.

According to various embodiments of the disclosure, the instructions may be configured to cause the processor 120 to: sense a second touch input through the sensor module; and determine whether or not at least one piece of second information related to the second touch input satisfies the changed condition of the pressure input.

According to various embodiments of the disclosure, the instructions may be configured to cause the processor 120 to determine that a pressure input has been sensed when the at least one piece of second information satisfies the changed condition of the pressure input.

According to various embodiments of the disclosure, the instructions may be configured to cause the processor 120 to determine that the designated condition is satisfied when the at least one piece of information corresponds to at least one of values within a range configured for the designated condition. The values within the range configured for the designated condition may include values within a range designated with reference to at least one threshold value configured for the condition of the pressure input.

According to various embodiments of the disclosure, the electronic device 300 may further include a display device 160. The instructions may be configured to cause the processor 120 to display an interface (for example, input sensitivity configuration screen 1000) for configuring the pressure input condition by using the display device 160. The interface may include an item for configuring at least one threshold value regarding the at least one piece of information, an image visually representing the at least one configured threshold value, and an image representing sensitivity of a user input in comparison with the image when the user input is made on the image.

Referring to FIG. 3B, the electronic device 301 may include a processor 120 and a TSP IC 310.

The touch screen panel integrated circuit (TSP IC) 310 adopts a capacitive type in which a predetermined amount of current is made to flow through a touchscreen panel (for example, display 210) such that a change in the capacitance of a signal occurring in the touchscreen panel, when an input means (for example, finger or stylus pen) contacts or approaches the touchscreen panel, can be identified. For example, the TSP IC 310 may identify the occurrence of the signal, based on the identified change in the capacitance, and may transfer the position in which the signal has occurred to the processor 120.

According to various embodiments of the disclosure, the TSP IC 310 may include a buffer 311, and may receive a measurement value related to at least one touch input through a sensor module (for example, 176) disposed outside or inside the electronic device 301. The received measurement value may be stored in the buffer 311.

The buffer 311 according to various embodiments of the disclosure may store various pieces of information related to a threshold value of at least one piece of information for determining a touch input. For example, the buffer 311 may store a threshold value of each item, condition information for changing a condition to determine a pressure input with reference to the threshold value, the number of touch inputs to be stored in order to change the condition, the touch coordinate of an input on a display device, and the like.

According to various embodiments of the disclosure, the TSP IC 310 and the processor 120 are illustrated as operating as separate components, but at least a part of the components may be omitted or modified, and the processor 120 may be configured to perform at least some operations of the TSP IC 310.

Figure 4:
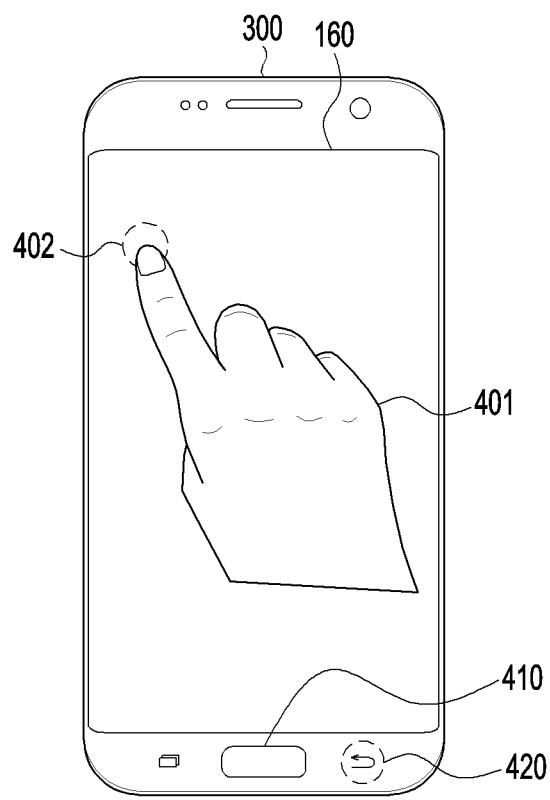
FIG. 4 is a diagram illustrating an example of an electronic device according to various embodiments of the disclosure.

FIG. 4 is a diagram illustrating an example of an electronic device according to various embodiments of the disclosure.

Referring to FIG. 4, the electronic device 300 may include a housing, a display device 160 exposed through a part of a surface of the housing, and multiple buttons (for example, home button 410 or execution cancellation button 420) disposed on the housing. For example, the multiple buttons may be configured as physical buttons, or may be displayed through the display device 160 and selected according to a touch input.

As a result of the user's body 401 contacting the display device 160 and a partial area 402 of the display device 160 or the home button 410, the electronic device 300 may identify a received touch input. For example, if the received touch input satisfies a pressure input condition, the electronic device 300 may determine that a force touch has been input. For example, the pressure input condition may include a threshold value regarding at least one of the input velocity, position, or intensity.

According to various embodiments of the disclosure, the electronic device 300 may identify information of a touch input satisfying a designated condition, among touch inputs that are input during a time designated with reference to a timepoint at which the touch input has been determined, or a timepoint at which the touch input has been determined as a pressure input (for example, during a designated time prior to the timepoint of determination or during a designated time before/after the timepoint of determination), thereby changing the pressure input condition. For example, the pressure input condition may be changed, based on the average value of measurement values of touch inputs satisfying the designated condition, or the maximum value among the measurement values.

According to various embodiments of the disclosure, the electronic device 300 may store information of a touch input, among touch inputs sensed during a designated time, which is followed by selection of a designated button (for example, execution cancellation button 420). For example, the electronic device 300 may further consider the information of the touch input followed by selection of the button, and may accordingly change the condition to determine whether or not the force touch has been input.

According to various embodiments of the disclosure, the electronic device 300 may not only determine whether or not a force touch has been input, but also store measurement values of touch inputs satisfying a designated condition or measurement values of touch inputs followed by selection of a specific button (for example, execution cancellation button 420), thereby changing the pressure input condition. For example, without requesting the user to separately manipulate the electronic device 300 so as to change the pressure input condition, the electronic device 300 may configure the pressure input condition, based on the pattern of touch inputs usually made by the user.

Figure 5:
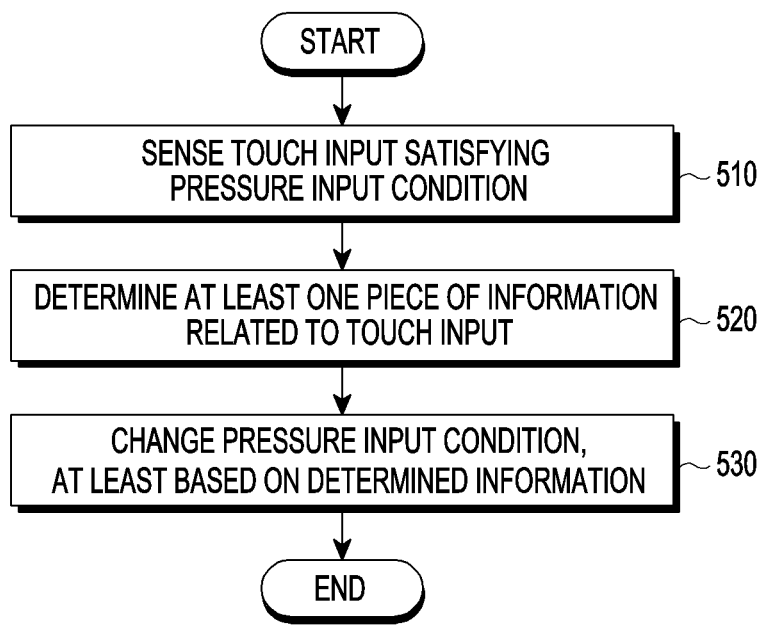
FIG. 5 is an operation flowchart illustrating an exemplary operation of determining a touch input by an electronic device according to various embodiments of the disclosure.

FIG. 5 is an operation flowchart illustrating an exemplary operation of determining a touch input by an electronic device according to various embodiments of the disclosure.

Referring to FIG. 5, in operation 510, the electronic device 300 may sense a touch input satisfying a pressure input condition.

In operation 520, the electronic device 300 may determine at least one piece of information related to a touch input satisfying a designated condition within a designated time. For example, the at least one piece of information may include at least one of the velocity, intensity, or position of the touch input.

In operation 530, the electronic device 300 may change the pressure input condition, at least based on the determined information.

In connection with a method for changing a condition to determine a touch input as a pressure input by an electronic device 300 according to various embodiments of the disclosure, the at least one piece of information may include designated information having a weight assigned thereto. The method may further include an operation of changing at least one threshold value related to the pressure input condition for determining at least a part of a touch input as a part of a pressure input, at least based on the at least one piece of information.

In connection with the method for changing a condition to determine a touch input as a pressure input by an electronic device 300 according to various embodiments of the disclosure, the at least one piece of information may include designated information having a weight assigned thereto. The method may further include an operation of changing at least one threshold value related to the pressure input condition, at least based on the at least one piece of information.

The method for changing a condition to determine a touch input as a pressure input by an electronic device 300 according to various embodiments of the disclosure may further include the operations of: configuring, when the stored at least one piece of information exhibits a value lower than a first threshold value configured as the pressure input condition, the first threshold value to be lower than a designated size; and configuring, when the stored at least one piece of information exhibits a value larger than the first threshold value, the first threshold value to be larger than the designated size.

The method for changing a condition to determine a touch input as a pressure input by an electronic device 300 according to various embodiments of the disclosure may further include the operations of: sensing a second touch input through the sensor module; and determining whether or not at least one piece of second information related to the second touch input satisfies the changed pressure input condition.

The method for changing a condition to determine a touch input as a pressure input by an electronic device 300 according to various embodiments of the disclosure may further include the operations of: determining that a pressure input has been sensed when the at least one piece of second information satisfies the changed pressure input condition.

The method for changing a condition to determine a touch input as a pressure input by an electronic device 300 according to various embodiments of the disclosure may further include the operations of: determining that the designated condition is satisfied when the at least one piece of information corresponds to at least one of values within a range configured for the designated condition. The values within the range configured for the designated condition may include values within a range designated with reference to at least one threshold value configured for the pressure input condition.

The method for changing a condition to determine a touch input as a pressure input by an electronic device 300 according to various embodiments of the disclosure may further include the operation of displaying an interface for configuring the pressure input condition. The interface may include an item for configuring at least one threshold value regarding the at least one piece of information, an image visually representing the at least one configured threshold value, and an image representing sensitivity of a user input in comparison with the image when the user input is made on the image.

In connection with the method for changing a condition to determine a touch input as a pressure input by an electronic device 300 according to various embodiments of the disclosure, the at least one piece of information may include the velocity of the input. The method may further include an operation of assigning a weight to the velocity of the input.

Figure 6:
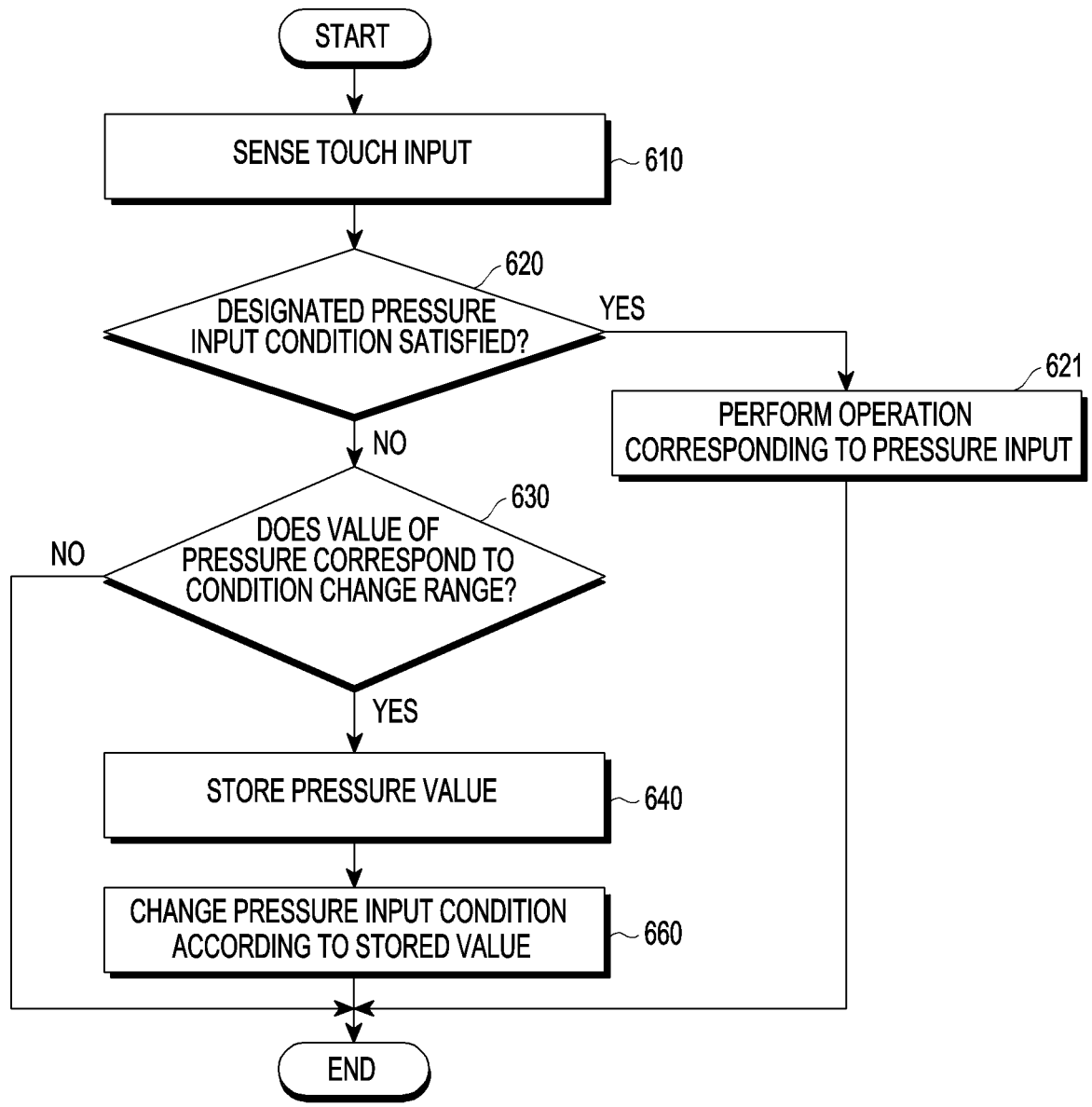
FIG. 6 is an operation flowchart illustrating an exemplary operation of determining a touch input by an electronic device according to various embodiments of the disclosure.

FIG. 6 is an operation flowchart illustrating an exemplary operation of determining a touch input by an electronic device according to various embodiments of the disclosure.

Referring to FIG. 6, in operation 610, the electronic device 300 may identify a touch input sensed through a sensor module 176. For example, the sensor module 176 may be included as a separate component in the electronic device, or included in the display device 160 of the electronic device, and may transmit sensing information from an external electronic device to the electronic device 300.

In operation 620, the electronic device 300 may determine whether or not the touch input satisfies a designated pressure input condition.

If the touch input satisfies the designated pressure input condition as a result of performing operation 620, the electronic device 300 may determine, in operation 621, that the touch input has been input as a pressure input, and may perform an operation corresponding to the pressure input.

If the touch input does not satisfy the designated pressure input condition as a result of performing operation 620, the electronic device 300 may determine, in operation 630, whether or not a value related to the touch input corresponds to a condition change range. For example, the value related to the touch input is a value of various pieces of information related to the touch input, and may include a value of at least one of the velocity, intensity, or position of the touch input.

In operation 640, the electronic device 300 may store the determined touch input value.

In operation 660, the electronic device 300 may change the pressure input condition according to the stored value. For example, the electronic device 300 may change at least one threshold value configured as the pressure input condition in view of the average value or maximum value of the stored values.

Figure 7:
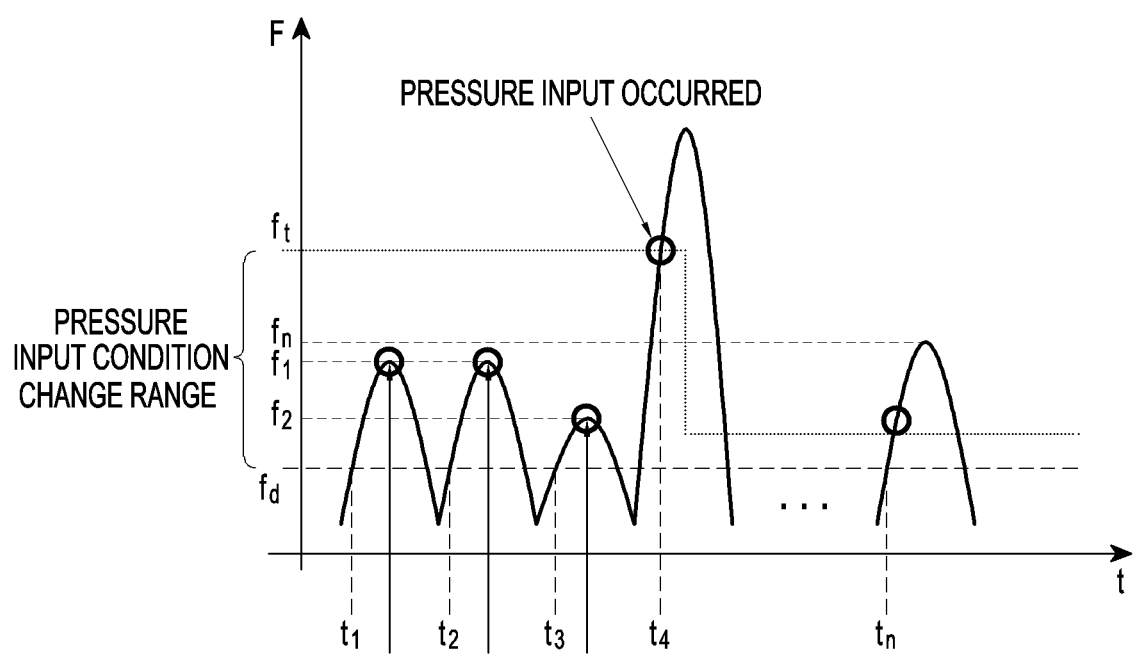
FIG. 7 is a graph illustrating an example of a measured touch input according to various embodiments of the disclosure.

FIG. 7 is a graph illustrating an example of a measured touch input according to various embodiments of the disclosure.

Referring to FIG. 7, an electronic device (for example, 300) may measure the intensity value of a touch input that is input during a predetermined time (for example, $t_1$-$t_4$) from a timepoint $t_1$ at which a touch input is sensed to a timepoint $t_4$ at which the touch input is released. For example, the electronic device may determine that a touch input (for example, input at $t_4$) made at an intensity of a threshold value $f_1$ is a force touch input.

According to various embodiments of the disclosure, the electronic device may store the touch intensity value (for example, $f_1$ or $f_2$) of a touch input satisfying a designated condition (for example, the touch intensity exceeds a designated value $f_d$ and is below a threshold value $f_1$) during the predetermined time. For example, if the number of stored touch inputs is equal to/larger than a designated number, the electronic device may use the touch intensity value of the stored touch inputs so as to configure the threshold value $f_1$ configured for the pressure input condition to determine the pressure input to be a value (for example, $f_2$) lower than the designated value.

According to various embodiments of the disclosure, the electronic device may determine, based on the changed pressure input condition, that, if a touch input is made with an intensity corresponding to the configured threshold value (for example, $f_2$) at a specific timepoint $t_n$, the input made at the timepoint $t_n$ is a pressure input.

Figure 8:
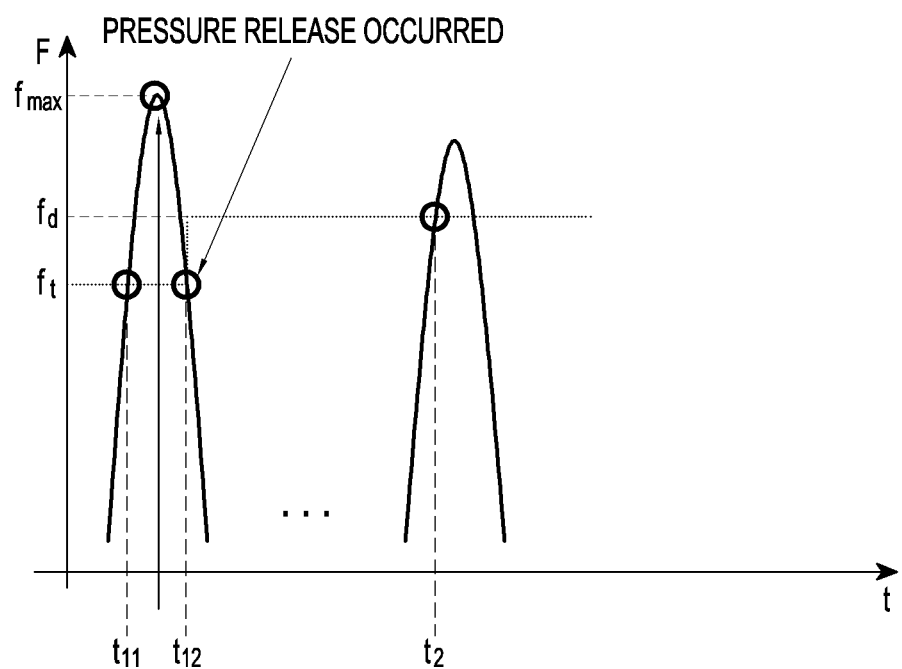
FIG. 8 is a graph illustrating an example of the value of a measured touch input according to various embodiments of the disclosure.

FIG. 8 is a graph illustrating an example of the value of a measured touch input according to various embodiments of the disclosure.

According to various embodiments of the disclosure, when the user makes a designated number of touch inputs or more at an intensity exceeding a threshold value for determining a pressure input, the electronic device may change the threshold value and thereby configure a pressure input condition according to the user.

Referring to FIG. 8, the electronic device (for example, 300) may measure the intensity value of a touch input made during a predetermined time (for example, $t_{11}$-$t_{12}$) from a timepoint $t_{11}$ at which a touch input is sensed to a timepoint $t_{12}$ at which the touch input is released. For example, the electronic device may determine, based on the intensity of the threshold value $f_1$, that the touch input (for example, input sensed at $t_{11}$ and released at $t_{12}$) is a pressure input.

According to various embodiments of the disclosure, the electronic device may store the intensity value of an input made under a designated condition (for example, maximum touch intensity value $f_{max}$) during the predetermined time. For example, if the difference between the stored maximum touch intensity value $f_{max}$ and the threshold value $f_1$ is equal to/larger than a designated value, the threshold value $f_1$ may be changed.

According to various embodiments of the disclosure, the electronic device may change the threshold value $f_1$ to a value (for example, $f_d$) higher than a predesignated value, in view of the maximum value (for example, $f_{max}$) among the stored inputs. For example, the changed threshold value $f_d$ may be the average value of the maximum touch intensity value $f_{max}$ and the threshold value $f_1$.

According to various embodiments of the disclosure, if a second touch input is made at an intensity corresponding to the threshold value $f_1$ after the threshold value is changed, the electronic device may determine that a touch input has been made, and may determine that a pressure input has been made when a third touch input is made at an intensity corresponding to the threshold value $f_d$ changed at a specific timepoint $t_2$.

Figure 9:
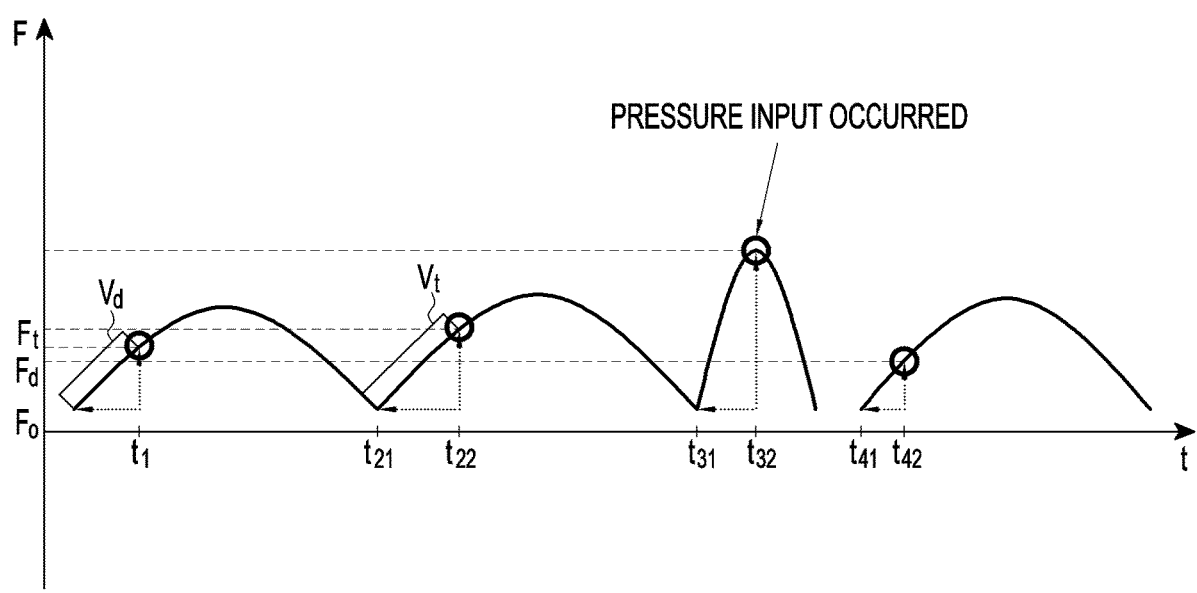
FIG. 9 is a graph illustrating an example of a measured touch input according to various embodiments of the disclosure.

FIG. 9 is a graph illustrating an example of a measured touch input according to various embodiments of the disclosure.

According to various embodiments of the disclosure, if the user makes a designated number of touch inputs or more at a velocity exceeding a threshold value for determining a pressure input, the electronic device may change the threshold value and thereby configure a pressure input condition according to the user.

Referring to FIG. 9, the electronic device (for example, 300) may measure the intensity value of a touch input made during a predetermined time (for example, $t_1$-$t_{32}$) from a timepoint $t_1$ at which a touch input is sensed to a timepoint $t_{32}$ at which the touch input is released. For example, the electronic device may determine that a touch input made at a specific velocity $V_t$ or higher is a pressure input.

According to various embodiments of the disclosure, velocity values (for example, $(F_d-F_0)/t_1$ or $(F_t-F_0)/(t_{21}-t_{22})$) of touch inputs corresponding to the amount of change in the intensity value of a touch input in a specific input interval (for example, first interval $t_1$-$t_{21}$ or second interval $t_{21}$-$t_{31}$) during the predetermined time may be identified. For example, the electronic device may store the input velocity value of a touch input, which has a designated value exceeding a value (for example, $V_d$), and which exhibits a maximum velocity value (for example, $V_t$) in an interval, among the identified velocity values. For example, if the number of the stored input velocity values is equal to/larger than a designated number, the electronic device may change the threshold velocity $V_t$ configured for the pressure input condition to a value (for example, $V_d$) lower than the designated value.

According to various embodiments of the disclosure, the electronic device may determine, based on the changed pressure input condition, that a touch input has been sensed if a touch input exceeding the threshold velocity $V_t$ is made during a specific time $t_{41}$-$t_{42}$, and may determine that a pressure input has been made if a touch input exceeding the changed threshold velocity $V_d$ is made.

Figure 10:
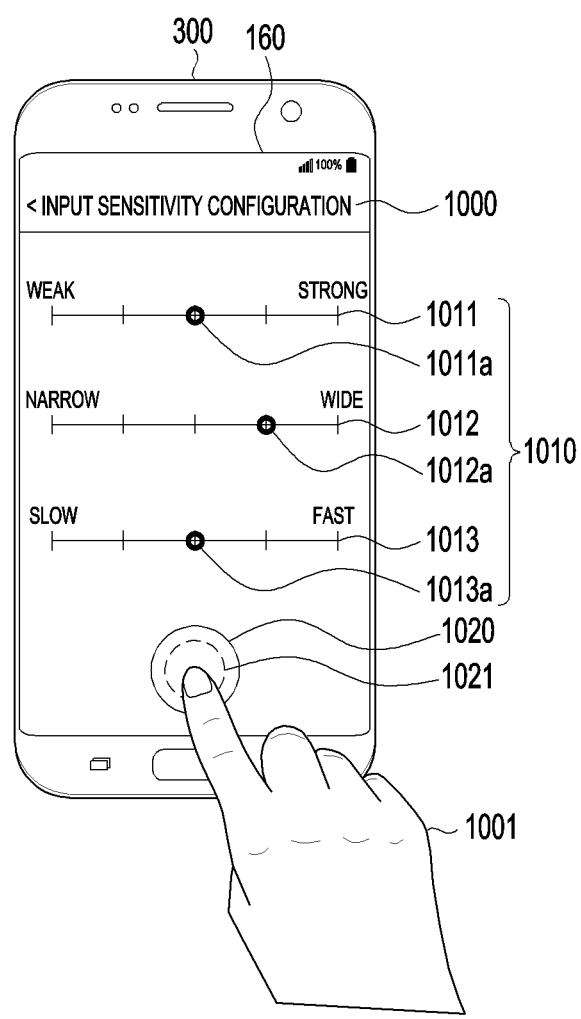
FIG. 10 is a diagram illustrating an exemplary screen for configuring a condition to determine a pressure input according to various embodiments of the disclosure.

FIG. 10 is a diagram illustrating an exemplary screen for configuring a condition to determine a pressure input according to various embodiments of the disclosure.

Referring to FIG. 10, an input sensitivity configuration screen 1000 may be displayed through a display device 160 of an electronic device 300. The screen 1000 may display, in order to configure a sensitivity for determining a pressure input, a configuration item 1010 for configuring the sensitivity intensity with regard to each type of sensitivity, and a sensitivity image 1020 following the configuration value in the item 1010.

According to various embodiments of the disclosure, the configuration item 1010 may include an input intensity configuration item 1011 for configuring the input intensity, an input size configuration item 1012 for configuring the input position or the size of the area, or an input velocity configuration item 1013 for configuring the input velocity. For example, when a touch input having a value corresponding to the value configured in the item is made, the electronic device may determine that the type of the touch input made corresponds to a pressure input.

According to various embodiments of the disclosure, the electronic device 300 may display an indicator 1011a for indicating the input intensity in the input intensity configuration item 1011. The user may touch the indicator 1011a and then move the same, thereby configuring the sensitivity of the input intensity to be weaker or stronger than the preconfigured value.

According to various embodiments of the disclosure, the electronic device 300 may display an indicator 1012a for indicating the input size in the input size configuration item 1012. The user may touch the indicator 1012a and then move the same, thereby configuring the sensitivity of the input size to be narrower or wider than the preconfigured value.

According to various embodiments of the disclosure, the electronic device 300 may display an indicator 1013a for indicating the input velocity in the input velocity configuration item 1013. The user may touch the indicator 1013a and then move the same, thereby configuring the sensitivity of the input velocity to be slower or faster than the preconfigured value.

According to various embodiments of the disclosure, the sensitivity image 1020 may be displayed with the size, color density, or color thereof changed according to the configuration value in the configuration item 1010. For example, the weaker the input intensity is configured, the weaker color the sensitivity image 1020 may be displayed to have, and the stronger the input intensity is configured, the stronger color the sensitivity image 1020 may be displayed to have. The narrower the input size is configured, the smaller the sensitivity image 1020 may be displayed, and the wider the input size is configured, the larger the sensitivity image 1020 may be displayed. The sensitivity image 1020 may be displayed to have a different color as the input velocity is configured to be slow or fast.

According to various embodiments of the disclosure, if the user applies a touch input to the sensitivity image 1020, a user input image 1021 corresponding to the intensity, size, and velocity of the touch input by the user may be displayed. For example, the user may configure the input sensitivity of a pressure input, and the electronic device 300 may display a sensitivity image 1020, the display of which is changed according to the configuration, and a user input image 1021, which is compared with the sensitivity image 1020. The user may intuitively identify the sensitivity of the touch input made by the user and the configured input sensitivity of a pressure input.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments asset forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStoreTM), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a sensor module;
a processor operatively connected to the sensor module; and
a memory operatively connected to the processor,
wherein the memory storing instructions configured to, when executed, cause the processor to:
sense a plurality of touch inputs through the sensor module during a designated time, the plurality of touch inputs being sequentially inputted;
detect intensities of the plurality of touch inputs;
based on the intensities of the plurality of touch inputs, change a threshold value which has been set to determine whether a touch input is a force touch input;
after the threshold value is changed, sense a touch input through the sensor module;
detect an intensity of the sensed touch input;
based on the intensity of the sensed touch input being greater than or equal to the changed threshold value, determine that the sensed touch input is the force touch input; and
based on determining that the sensed touch input is the force touch input, perform a function corresponding to the force touch input.

2. The electronic device of claim 1, wherein the instructions are further configured to cause the processor to:
based on the intensity of the sensed touch input being lower the changed threshold value, determine that the sensed touch input is non-force touch input; and
based on determining that the sensed touch input is the non-force touch input, perform a function corresponding to the non-force touch input.

3. The electronic device of claim 1, wherein the instructions are configured to cause the processor to:
change the threshold value into a first threshold value lower than the threshold value, based on the intensities of the plurality of touch inputs being lower than the threshold value; and
change the threshold value into a second threshold value greater than the threshold value, based on the intensities of the plurality of touch inputs being greater than the threshold value.

4. The electronic device of claim 3, wherein the instructions are configured to cause the processor to:
detect a plurality of first touch inputs among the plurality of touch inputs, intensities of the plurality of first touch inputs being lower than the threshold value and greater than a designated value; and
change the threshold value into the first threshold value lower than the threshold value, based on the intensities of the plurality of first touch inputs.

5. The electronic device of claim 3, wherein the instructions are configured to cause the processor to:
based on a number of the plurality of first touch inputs being greater than or equal to a designated number, change the threshold value into the second threshold value.

6. The electronic device of claim 3, wherein the instructions are configured to cause the processor to:
detect a plurality of second touch inputs among the plurality of touch inputs, intensities of the plurality of second touch inputs being greater than the threshold value;
determine a touch input having a maximum intensity among the plurality of second touch inputs; and
change the threshold value into the second threshold value which is an average value of the maximum intensity and the threshold value.

7. The electronic device of claim 6, wherein the instructions are configured to cause the processor to:
based on a number of the plurality of second touch inputs being greater than or equal to a designated number, determine the touch input having the maximum intensity among the plurality of second touch inputs.

8. An electronic device comprising:
a sensor module;
a processor operatively connected to the sensor module; and
a memory operatively connected to the processor, wherein the memory storing instructions configured to, when executed, cause the processor to:
sense a plurality of touch inputs through the sensor module during a designated time, the plurality of touch inputs being sequentially inputted;
detect velocities of the plurality of touch inputs;
based on the velocities of the plurality of touch inputs, change a threshold value which has been set to determine whether a touch input is a force touch input;
after the threshold value is changed, sense a touch input through the sensor module;

detect a velocity of the sensed touch input;
based on the velocity of the sensed touch input being greater than or equal to the changed threshold value, determine that the sensed touch input is the force touch input; and
based on determining that the sensed touch input is the force touch input, perform a function corresponding to the force touch input.

9. The electronic device of claim 8, wherein the instructions are further configured to cause the processor to:
based on the velocity of the sensed touch input being lower the changed threshold value, determine that the sensed touch input is non-force touch input; and
based on determining that the sensed touch input is the non-force touch input, perform a function corresponding to the non-force touch input.

10. The electronic device of claim 8, wherein the instructions are configured to cause the processor to:
change the threshold value into a first threshold value lower than the threshold value, based on the velocities of the plurality of touch inputs being lower than the threshold value; and
change the threshold value into a second threshold value greater than the threshold value, based on the velocities of the plurality of touch inputs being greater than the threshold value.

11. A method for changing a condition to determine a touch input as a force touch input by an electronic device, the method comprising:
sensing a plurality of touch inputs through a sensor module of the electronic device during a designated time, the plurality of touch inputs being sequentially inputted;
detecting intensities of the plurality of touch inputs;
based on the intensities of the plurality of touch inputs, changing a threshold value which has been set to determine whether a touch input is the force touch input;
after the threshold value is changed, sensing a touch input through the sensor module;
detecting an intensity of the sensed touch input;
based on the intensity of the second touch input being greater than or equal to the changed threshold value, determining that the sensed touch input is the force touch input; and
based on determining that the sensed touch input is the force touch input, performing a function corresponding to the force touch input.

12. The method of claim 11, further comprising:
based on the intensity of the sensed touch input being lower the changed threshold value, determining that the sensed touch input is non-force touch input; and
based on determining that the sensed touch input is the non-force touch input, performing a function corresponding to the non-force touch input.

13. The method of claim 11, wherein changing the threshold value further comprises:
changing the threshold value into a first threshold value lower than the threshold value, based on the intensities of the plurality of touch inputs being lower than the threshold value; and
changing the threshold value into a second threshold value greater than the threshold value, based on the intensities of the plurality of touch inputs being greater than the threshold value.

14. The method of claim 13, wherein changing the threshold value into the first threshold value further comprises:
detecting a plurality of first touch inputs among the plurality of touch inputs, intensities of the plurality of first touch inputs being lower than the threshold value and greater than a designated value; and
changing the threshold value into the first threshold value lower than the threshold value, based on the intensities of the plurality of first touch inputs.

15. The method of claim 13, wherein changing the threshold value into the second threshold value further comprises:
detecting a plurality of second touch inputs among the plurality of touch inputs; intensities of the plurality of second touch inputs being greater than the threshold value;
determining a touch input having a maximum intensity among the plurality of second touch inputs; and
changing the threshold value into the second threshold value which is an average value of the maximum intensity and the threshold value.

* * * * *